(12) United States Patent
Coltrain

(10) Patent No.: US 11,084,539 B1
(45) Date of Patent: Aug. 10, 2021

(54) STACKABLE TRANSPORT FRAME

(71) Applicant: T-Mobile USA, Inc., Bellevue, WA (US)

(72) Inventor: Christopher C. Coltrain, Lewisville, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/833,460

(22) Filed: Mar. 27, 2020

(51) Int. Cl.
| | |
|---|---|
| B62D 33/02 | (2006.01) |
| B65G 67/20 | (2006.01) |
| B60P 3/06 | (2006.01) |
| B60P 1/64 | (2006.01) |
| B65D 19/38 | (2006.01) |
| B65D 19/44 | (2006.01) |
| B65D 85/68 | (2006.01) |

(52) U.S. Cl.
CPC ............ *B62D 33/0207* (2013.01); *B60P 1/64* (2013.01); *B60P 3/06* (2013.01); *B65D 19/385* (2013.01); *B65D 19/44* (2013.01); *B65D 85/68* (2013.01); *B65G 67/20* (2013.01)

(58) Field of Classification Search
CPC .......... B62D 33/0207; B60P 1/62; B60P 3/06; B60P 3/1033; B65D 19/44; B65D 19/385; B65D 85/68; B65D 2585/68; B65D 19/0002; B65D 19/0053
USPC ..... 108/55.1, 55.3, 57.22; 410/3, 55, 56, 66, 410/67
See application file for complete search history.

(56) References Cited

U.S. PATENT DOCUMENTS

| | | | | |
|---|---|---|---|---|
| 6,820,752 | B2 * | 11/2004 | Jeskey ................. | B65G 49/062 206/454 |
| 8,006,984 | B2 * | 8/2011 | Chubb ..................... | B62B 3/16 280/33.998 |
| 8,967,943 | B2 * | 3/2015 | Drott .................... | B65D 88/522 414/809 |
| 10,336,356 | B2 * | 7/2019 | Dyson ...................... | B62B 3/02 |
| 10,954,033 | B2 * | 3/2021 | Kolecki ................. | B65D 19/12 |
| 2015/0257530 | A1 * | 9/2015 | Naka ................... | A47B 47/0091 211/188 |
| 2017/0349324 | A1 * | 12/2017 | Golanowski ....... | B65D 11/1833 |
| 2018/0370412 | A1 * | 12/2018 | Andre ..................... | B60P 3/073 |
| 2020/0102143 | A1 * | 4/2020 | Payne .................... | B65D 85/68 |

* cited by examiner

*Primary Examiner* — Kaitlin S Joerger
(74) *Attorney, Agent, or Firm* — Barta, Jones & Foley, P.C.

(57) ABSTRACT

Examples provide a method and apparatus for transporting equipment using a stackable transport frame. A set of adjustable brackets are removably attached to a portion of the stackable transport frame. The set of adjustable brackets are oriented in a downward and vertical configuration which is perpendicular to the transport frame to removably secure the stackable transport frame to a trailer. A set of parallel frame members define a wheel securing aperture to accommodate one or more wheels on the equipment being transported. A support member on the transported equipment sits within a longitudinal channel. A set of stacking brackets are configured to support a set of stackable transport frames in a vertical stacked configuration during storage.

20 Claims, 20 Drawing Sheets

STACKABLE TRANSPORT FRAME

BACKGROUND

During emergency management and response, it is frequently necessary to transport generators, supplies and other equipment into areas where events, such as natural disasters, have disrupted normal power and communications delivery and/or infrastructure. Electric generators may be transported on flatbed trailers, but they are heavy and bulky devices which are difficult and time consuming to load and unload. Moreover, during transport, the generators can shift on the flatbed trailer. The generators can be partially secured using straps, chains and chalks, but this does not prevent them from sliding off the sides of the trailers due to lateral (side-to-side) movement. Thus, transport of generators and other bulky equipment on flatbed trailers is time-consuming, difficult, inefficient and potentially hazardous.

SUMMARY

The disclosed examples are described in detail below with reference to the accompanying drawing figures listed below. The following summary is provided to illustrate implementations disclosed herein. It is not meant, however, to limit all examples to any particular configuration or sequence of operations.

Some aspects and implementations disclosed herein are directed at a transport frame for stabilizing generators and other equipment during transportation. The stackable transport frame including a set of one or more adjustable brackets removably attached to at least a portion of a first frame member via a set of removable fasteners. The set of adjustable brackets are configured to removably secure the stackable transport frame to at least a portion of a transport vehicle. A set of parallel frame members define a wheel securing aperture which accommodates at least one wheel of at least one mobile equipment. A set of stacking brackets associated with at least one frame member. The set of stacking brackets are configured to support a set of stackable transport frames in a vertical stacked configuration. A longitudinal channel is configured to at least partially enclose a portion of a mobile equipment support member.

The features, functions, and advantages that have been discussed are achieved independently in various implementations or are to be combined in yet other implementations, further details of which are seen with reference to the following description and drawings.

BRIEF DESCRIPTION OF THE DRAWINGS

Corresponding reference characters indicate corresponding parts throughout the drawings.

DETAILED DESCRIPTION

Figure 1:
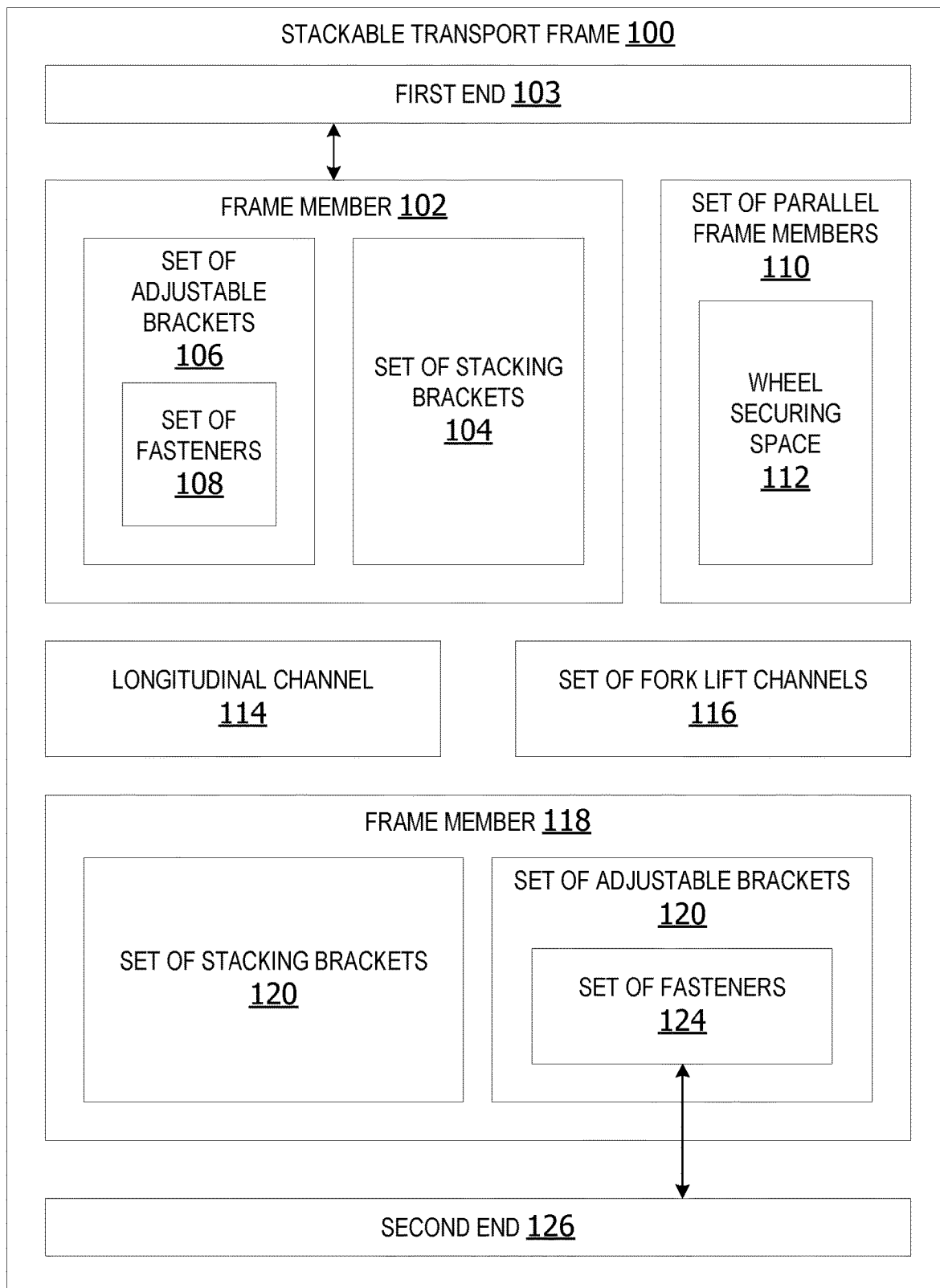
FIG. 1 is an exemplary block diagram illustrating a stackable transport frame for stabilizing mobile equipment during loading, transport and unloading.

The various implementations will be described in detail with reference to the accompanying drawings. Wherever possible, the same reference numbers will be used throughout the drawings to refer to the same or like parts. References made throughout this disclosure relating to specific implementations and implementations are provided solely for illustrative purposes but, unless indicated to the contrary, are not meant to limit all implementations.

The foregoing summary, as well as the following detailed description of certain implementations will be better understood when read in conjunction with the appended drawings. As used herein, an element or step recited in the singular and preceded by the word "a" or "an" should be understood as not necessarily excluding the plural of the elements or steps. Further, references to "one implementation" are not intended to be interpreted as excluding the existence of additional implementations that also incorporate the recited features. Moreover, unless explicitly stated to the contrary, implementations "comprising" or "having" an element or a plurality of elements having a particular property could include additional elements not having that property.

Currently, generators and other heavy equipment can be transported on flatbed trailers. A standard fifty-three inch (53 in.) long flatbed trailer can transport approximately five electric generators tied down with straps or chains with wheels secured by chalks or wooden boards. However, loading the generators onto the trailers and off-loading them is a time-consuming and difficult process. The generators may slip off the trailer, be damaged during loading and off-loading, as well as pose potential risk of injury to human users performing the loading and off-loading.

Moreover, transport vehicle motion during transport can cause the generators and other equipment to shift and slide off the edge of the trailer due to lateral motions. This can result in damage to the generator as well as the trailer and any other equipment in the area.

Aspects of the disclosure provide a transport frame for securing and stabilizing generators and other equipment on flatbed trailers or other transport vehicles for transport. The transport frame includes a set of adjustable brackets for securing the frame to a trailer. The adjustable brackets allow the frame to be adjusted to the size and width of different trailers. This allows for greater flexibility and adaptability enabling the frame to be used with varying types of trailers and other transportation vehicles.

In other examples, the transport frame includes a set of stacking brackets which permit multiple transport frames to be stacked vertically when not in use. This minimizes the storage footprint of the frames while simplifying the storage process.

A set of forklift channels in some examples enable the transport frame to be easily and efficiently loaded onto a trailer and/or unloaded off a trailer. This simplifies transport and handling of the frames while minimizing damage to the frame and preventing injury to users.

Other aspects of the disclosure provide a set of parallel frame members for securing one or more wheel(s) of one or more generators or other equipment being transported via the transport frame. This prevents the generators from shifting laterally during transport.

A longitudinal channel in other examples secures a support member of each generator being transported via the transport frame. The support member may be a towing hitch or a jack on the generator. The channel provides additional stabilization of generators seated on a flatbed trailer during transport. This prevents the generators from sliding off the sides of the trailer to minimize damage to the generators and the trailer.

Referring more particularly to the drawings, FIG. 1 provides an exemplary block diagram illustrating a stackable transport frame 100 for stabilizing mobile equipment during loading, transport and unloading. The mobile equipment optionally includes electric generators or any other type of equipment. In some examples, the stackable transport frame 100 is a stackable generator transport frame for transporting one or more generators.

The stackable transport frame 100 provides a framework for stabilizing and securing mobile equipment during transport in a cargo area of a transport vehicle, such as, but not limited to, a flatbed trailer associated with a semi-truck.

The stackable transport frame 100 can be constructed of any type of suitable material. For example, but without limitation, the stackable transport frame 100 may be composed of metal, wood, synthetic material or any type of composite material. In this non-limiting example, the stackable transport frame 100 is composed of galvanized steel which provides additional durability and strength. In other examples, the stackable transport frame 100 is composed of aluminum.

The stackable transport frame 100 includes a first frame member 102. The first frame member includes a set of one or more stacking brackets 104 and a set of one or more adjustable brackets 106 for securing the stackable transport frame to a portion of a transport vehicle, such as, the flatbed trailer. The set of adjustable brackets are removably attached to the stackable transport frame 100 via a set of one or more fasteners 108. A fastener in the set of fasteners 108 can be implemented as any type of fastener, such as, but not limited to, a bolt, screw, pin, clip, chain, latch, clamp or any other type of fastener.

A set of parallel frame members 110 is a set of two or more parallel frame members defining a wheel securing space 112 configured to accommodate one or more wheels of each piece of mobile equipment placed on the stackable transport frame 100. The set of parallel frame members 110 in this non-limiting example includes two frame members spaced apart such that the space between them is sufficient to accommodate the footprint of at least one wheel on a generator or other mobile equipment.

A longitudinal channel 114 is configured to accommodate the foot or bottom of a support member on at least one item of mobile equipment placed on the stackable transport frame. The support member can be implemented as a jack, a tow bar, foldable tongue, a support stand, a leg, or any other support member on mobile equipment. Where the support member is a foldable tongue, the tongue folds down into the channel 114.

The channel 114 has a width which is equal to or greater than the width of the foot or bottom surface (footprint) of the support member. In some examples, the longitudinal channel 114 runs parallel to the sides of the stackable transport frame 100 and perpendicular to the first frame member 102.

In some examples, the stackable transport frame 100 optionally includes a set of one or more forklift channels 116. The set of forklift channels 116 provides one or more channels defining a space having a length and width sufficient to accommodate a fork on a forklift. The set of forklift channels 116 are utilized to lift, raise, lower, load, unload or otherwise move the stackable transport frame 100.

A fourth frame member 118 opposing the first frame member 102 provides a set of one or more stacking brackets 120 and a set of one or more adjustable brackets 122 at the second end of the stackable transport frame 100. The set of adjustable brackets 122 are removably secured to the second end 126 of the stackable transport frame 100.

The set of stacking brackets 105 associated with the first frame member 102 of the stackable transport frame 100 and the set of stacking brackets 120 associated with the fourth frame member 118 of the stackable transport frame 100 is configured for supporting one or more frame members of one or more other stackable transport frames in a stacked configuration when the stackable transport frames are not in use. In some examples, two stacking brackets are provided on the first frame member 102 and two stacking brackets are provided on the fourth frame member 118. In other examples, a single stacking bracket is provided proximate to each end of the first frame member 102 and the fourth frame member 118. This provides a quick and convenient way to store the transport frames in a stacked configuration which minimizes storage space requirements for storing a plurality of transport frames.

In some examples, the stackable transport frame 100 is sized to fit on a flatbed trailer. In this example, the stackable transport frame 100 is approximately one hundred and two inches wide and twenty-six and a half feet long. With these measurements, two stackable transport frames can fit onto a single fifty-three-foot long flatbed trailer. However, the examples, are not limited to these measurements. In other examples, a stackable transport frame 100 has a length within a range from twenty feet to twenty-six feet. In other examples, the stackable transport frame 100 has a width in a range from eight inches to one hundred-five inches.

Figure 2:
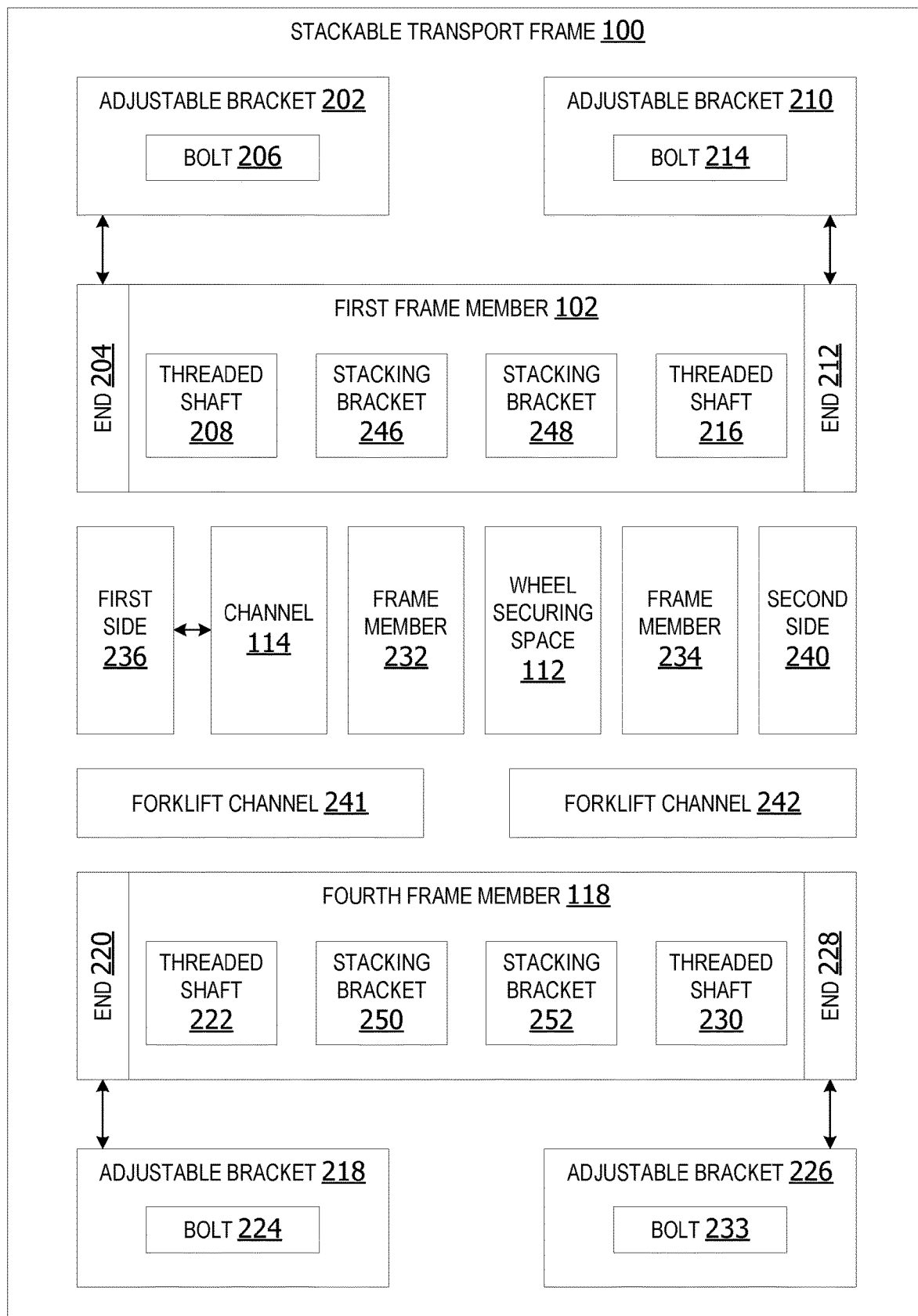
FIG. 2 is an exemplary block diagram illustrating a stackable transport frame including adjustable brackets secured to the stackable transport frame via one or more bolts.

FIG. 2 is an exemplary block diagram illustrating a stackable transport frame 100 including adjustable brackets secured to the stackable transport frame 100 via one or more bolts. The stackable transport frame 100 includes a set of adjustable brackets associated with each of the first frame member 102 and the fourth frame member 118. In this example, a first adjustable bracket 202 is removably attached to a first end 204 of the first frame member 102 via a bolt 206 secured through a threaded shaft 208. A second adjustable bracket 210 is secured to a second end 212 opposite the first end 204 of the first frame member 102 via a bolt 214 threaded through a second threaded shaft 216 in at least a portion of the first frame member 102 proximate the second end 212.

A third adjustable bracket 218 is removably attached to a first end 220 of the fourth frame member 118. The third adjustable bracket is attached to the frame member via a bolt 224 threaded through a threaded shaft 222 proximate to the first end 220 of the frame member 118. A fourth adjustable bracket 226 is removably attached to a second end 228 of the fourth frame member which is opposite the first end 220. The fourth adjustable bracket 226 is removably attached via a bolt 233 threaded through a threaded shaft 230 proximate to the second end of the fourth frame member 118.

In this non-limiting example, the adjustable brackets are removably attached to the stackable transport frame 100 via a set of four bolts. However, the examples are not limited to bolts threaded through threaded shafts. In other examples, the adjustable brackets are attached via pins, clamps, brackets or any other type of fastener.

A longitudinal channel 114 in some examples runs parallel to a second frame member 232 and a third frame member 234. The channel 114 is located at a first side 236 of the stackable transport frame 100.

The second frame member 232 and third frame member 234 define a wheel securing space 112. The third frame member is located at or near a second side 240 of the stackable transport frame 100.

A set of forklift channels in this example includes a first forklift channel 241 and a second forklift channel 242. The set of forklift channels runs perpendicular to the second frame member 232 and the third frame member 234. In this non-limiting example, the set of forklift channels do not overlap or cross over the second frame member 232 and the third frame member 234 but does not overlap the channel 114.

The set of stacking brackets in some examples includes a first stacking bracket 246 and a second stacking bracket 248 on the first frame member. The set of stacking brackets also includes a third stacking bracket 250 and a fourth stacking bracket 252 on the fourth frame member 118.

Figure 3:
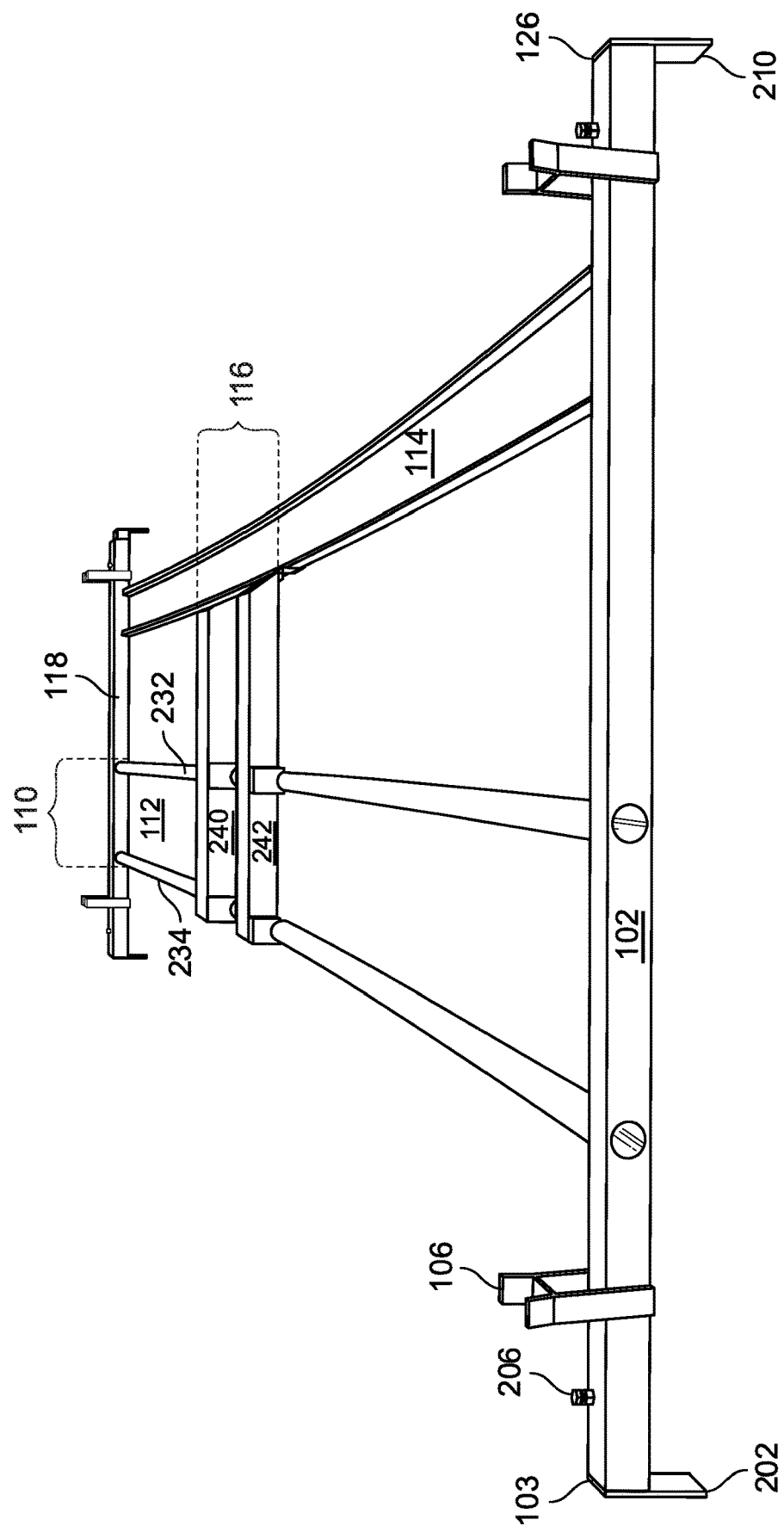
FIG. 3 is an exemplary block diagram illustrating a perspective view of a stackable transport frame.

FIG. 3 is an exemplary block diagram illustrating a perspective view of a stackable transport frame 100. The stackable transport frame 100 includes a first frame member 102 having at least one adjustable bracket 202 at one end 103 of the frame member. The adjustable bracket 202 is removably attached via a fastener, such as, but not limited to, a bolt 206.

A set of parallel frame members 110 includes a second frame member 232 is parallel to a third frame member 234. The set of parallel frame members 110 form a wheel securing space 112. In this example, the set of parallel frame members 110 are implemented as a set of two pipe-like members. However, the second and third frame members are not limited to implementation as a pipe or pipe-like member. In other examples, the second frame member 232 and/or the third frame member 234 may be implemented as a rectangular-shaped member, an oval shaped member, or rectangular shaped member, or any other shaped member configured to act as wheel chalks defining a wheel securing space 112.

The wheel securing space 112 is a gap or area between the set of parallel members. The wheel securing space 112 is sized or otherwise configured to accommodate the wheel(s) of a generator or other mobile equipment. The distance between each member in the set of parallel frame members is selected based on the size of the wheel(s) on the mobile equipment or generator which will seat within the wheel securing space 112.

A fourth frame member 118 is opposite the first frame member 102. The fourth frame member 118 also includes a set of stacking brackets and a set of adjustable brackets, such as, but not limited to, the set of stacking brackets 120 and the set of adjustable brackets 122 in FIG. 1.

Figure 4:
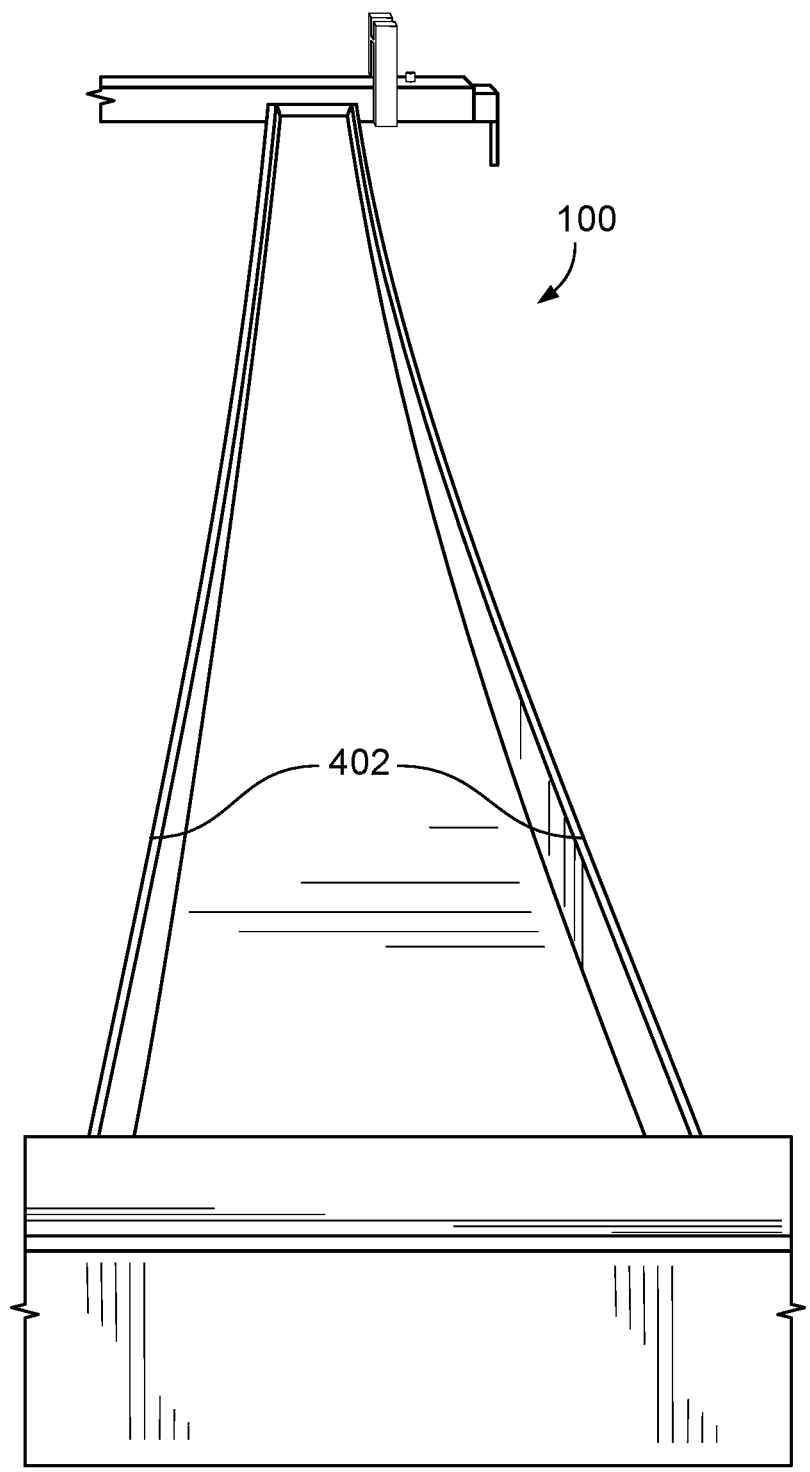
FIG. 4 is an exemplary block diagram illustrating a longitudinal channel associated with a stackable transport frame.

FIG. 4 is an exemplary block diagram illustrating a longitudinal channel 114 associated with a stackable transport frame 100. The longitudinal channel 114 runs parallel to a side of the stackable transport frame 100. The channel 114 is implemented as a tray or platform configured to accommodate the footprint (size and shape) of the bottom of a support member on a generator or other mobile equipment seated on the stackable transport frame 100. In some examples, the channel 114 is the same length as the stackable transport frame 100. In other examples, the width of the channel 114 is equal to or greater than the width of the foot or bottom of the support member.

In some examples, the longitudinal channel 114 includes a lip 402. The lip 402 prevents the support member from slipping outside the channel when a support member is seated within the channel during loading, unloading or transit. In this example, the lip 402 is included along both sides of the channel. However, the examples are not limited to a lip along both sides of the channel. In other examples, the lip 402 is only included along the exterior side of the channel closest to the outer edge of the trailer when the stackable transport frame is resting on the trailer. In still other examples, the channel 114 does not include a lip along either side of the channel.

Figure 5:
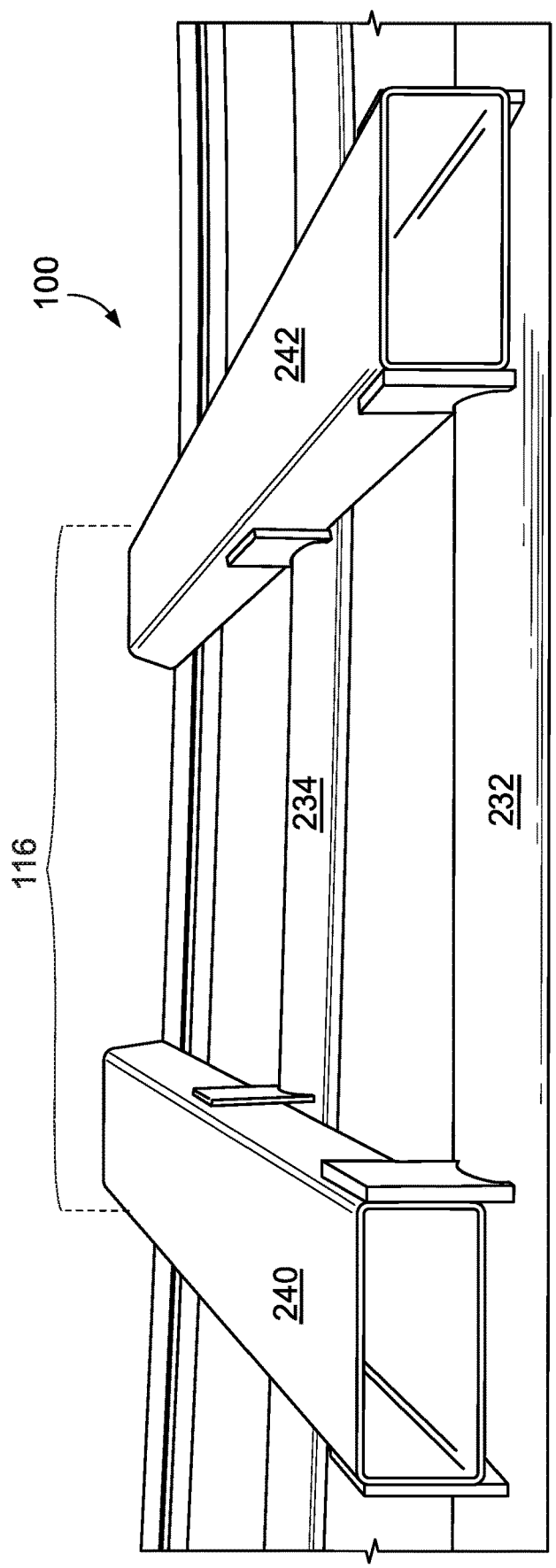
FIG. 5 is an exemplary block diagram illustrating a set of forklift channels associated with a stackable transport frame.

FIG. 5 is an exemplary block diagram illustrating a set of forklift channels 116 associated with a stackable transport frame 100. The set of forklift channels 116 includes a first forklift channels 241 and a second forklift channel 242. Each forklift channel defines a space sufficient to accommodate a fork of a forklift. The set of forklift channels 116 are perpendicular to the second frame member 232 and the third frame member 234. The set of forklift channels 116 in this non-limiting example are attached to a top surface of the second frame member 232 and the third frame member 234.

In this example, the set of forklift channels 116 are welded to the second frame member and the third frame member. However, the examples are not limited to attachment by welding. In other examples, the set of forklift channels are fastened via bolts, brackets, adhesive or other type of attachment.

Figure 6:
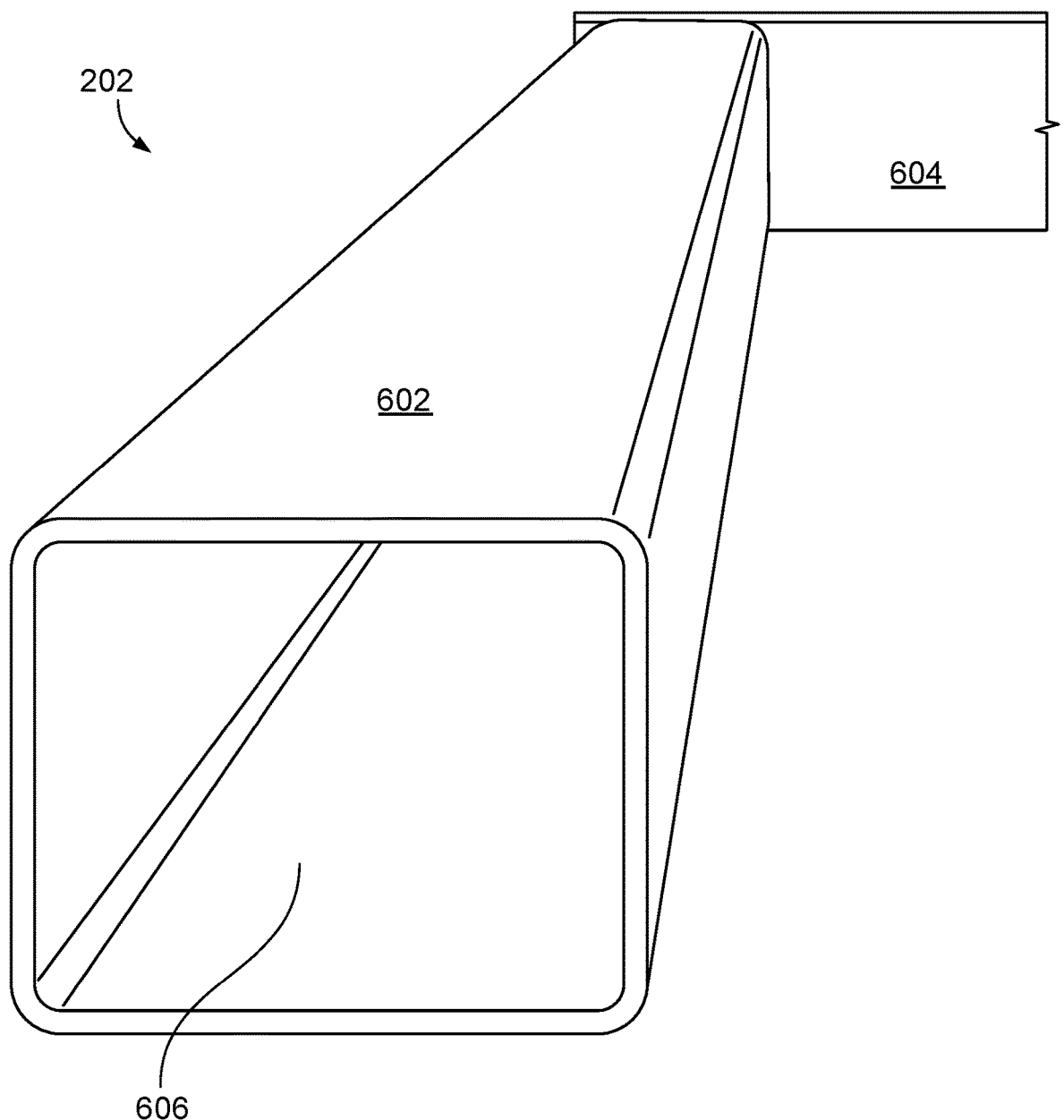
FIG. 6 is an exemplary block diagram illustrating an adjustable bracket detached from the stackable transport frame.

FIG. 6 is an exemplary block diagram illustrating an adjustable bracket 202 detached from the stackable transport frame. The adjustable bracket 202 includes a main body 602 and an end piece 504. The main body 602 defines a cavity 606 configured to at least partially enclose an end of the first frame member or the fourth frame member. The end piece 504 is substantially perpendicular to the main body. The adjustable bracket 202 may be attached to the end of a frame member such that the end piece 604 is oriented upwards or oriented downwards.

In some examples, when the adjustable bracket 202 is attached to the stackable transport frame for securing the transport frame to the trailer or other transport vehicle. In other examples, when the stackable transport frame is in a stacked configuration, the end piece 604 can be oriented either upward or downward depending on the position of the stackable transport frame within the stack. For example, the first stackable transport frame in the stack (bottom) has the adjustable bracket 202 oriented with the end piece 604 oriented upward to permit the stackable transport frame to rest flat on the ground. In another example, if the stackable transport frame is the last frame in the stack (top), the end piece 604 may optionally be oriented downward.

Figure 7:
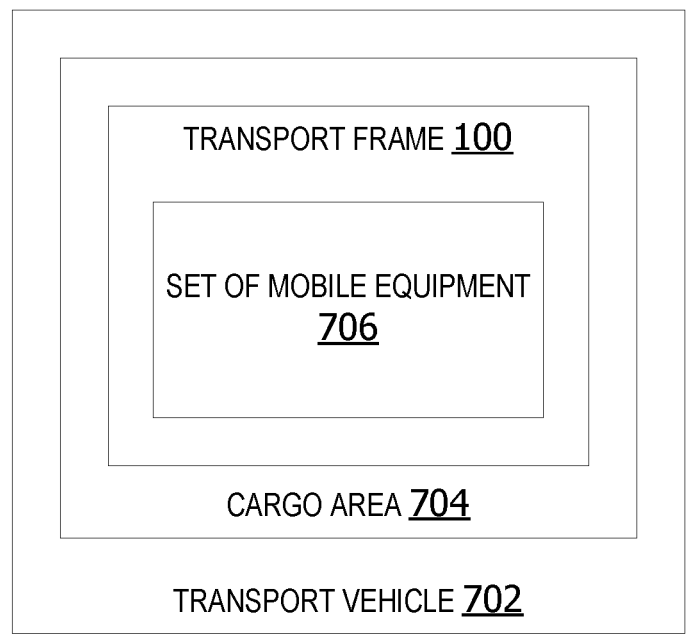
FIG. 7 is an exemplary block diagram illustrating a stackable transport frame on a transport vehicle.

FIG. 7 is an exemplary block diagram illustrating a stackable transport frame 100 on a transport vehicle 702. The stackable transport frame 100 in this example is resting on a surface of a cargo area 704 of the transport vehicle 702. The cargo area 704 of the transport vehicle 702 in this non-limiting example is a surface of a flatbed trailer. A set of mobile equipment 706 are seated on top of the stackable transport frame 100 on the trailer. The set of mobile equipment 706 may include a single item of mobile equipment, as well as two or more items of mobile equipment. Thus, if the mobile equipment includes generators, the set of mobile equipment 706 can include one or more generators.

Figure 8:
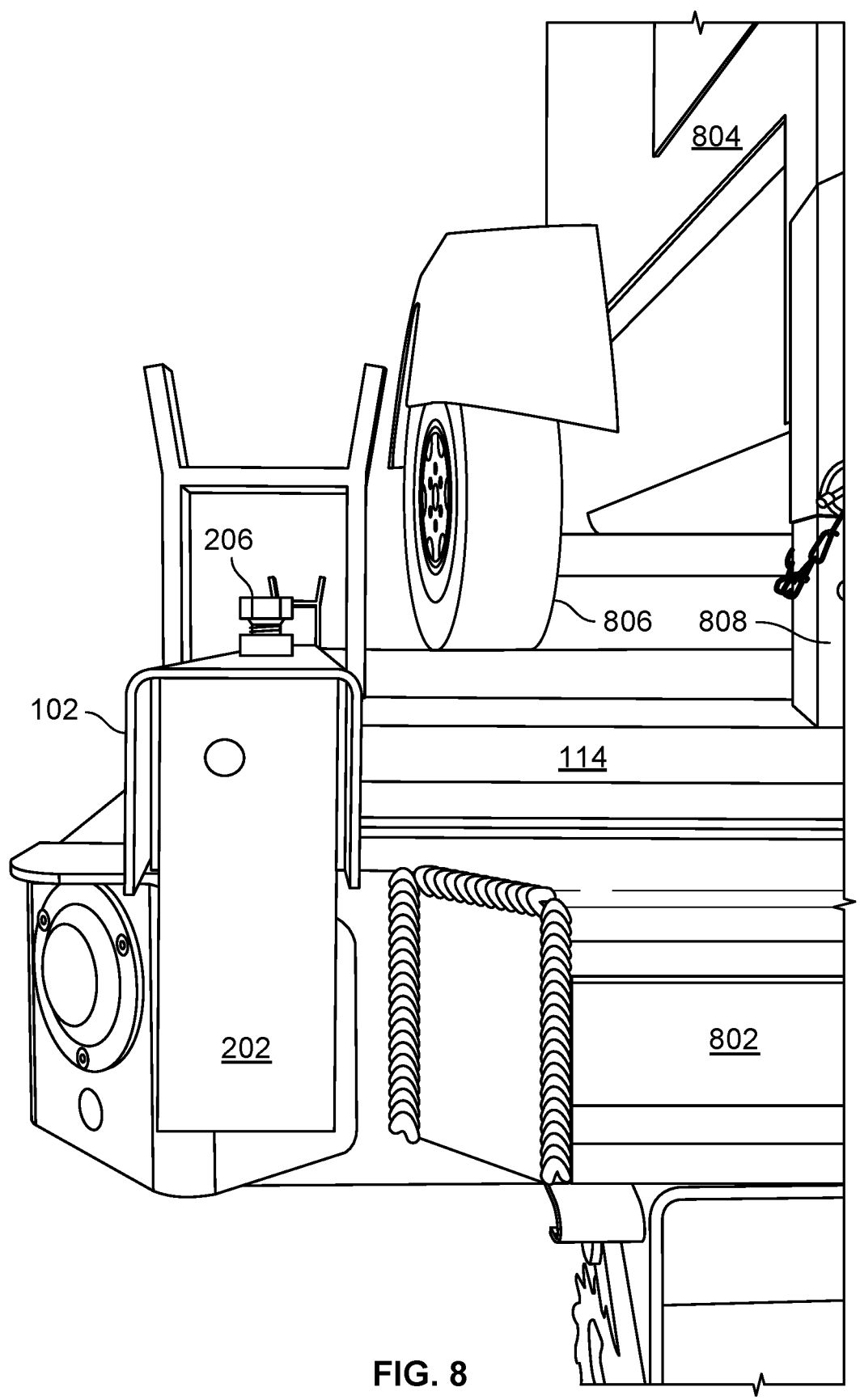
FIG. 8 is an exemplary block diagram illustrating an adjustable bracket securing the stackable transport frame to a transport vehicle.

FIG. 8 is an exemplary block diagram illustrating an adjustable bracket 202 securing the stackable transport frame 100 to a transport vehicle. The adjustable bracket 202 in this non-limiting example is removably attached to the first frame member 102 via a bolt 206 fastener. The end piece of the adjustable bracket in this example is oriented downward to secure the stackable transport frame 100 to a portion of a trailer 802.

A generator 804 is seated on top of the stackable transport frame 100. A wheel 806 of the generator rests within the wheel securing space created by the set of parallel frame members. The set of parallel members secure the wheel in place during transport, as well as acts as a guide for loading the generator 804 into the correct configuration or placement on the stackable transport frame 100. If the generator 804 is loaded such that the wheels are initially placed on top of either the second frame member or the third frame member, the wheel rolls forward or backward to rest within the wheel securing space. In this manner, the stackable transport frame 100 provides a loading guide for loading the generator 804 onto the trailer 802 as well as preventing the generator from rolling, shifting or moving out of place during travel.

A portion of a jack 808 attached to the generator 804 is seated within the longitudinal channel 114. The longitudinal channel 114 assist with securing the jack during loading, unloading and transport. In other words, the channel prevents the jack from sliding laterally during travel and assist in the loading process by acting as a guide for placement of the jack.

Figure 9:
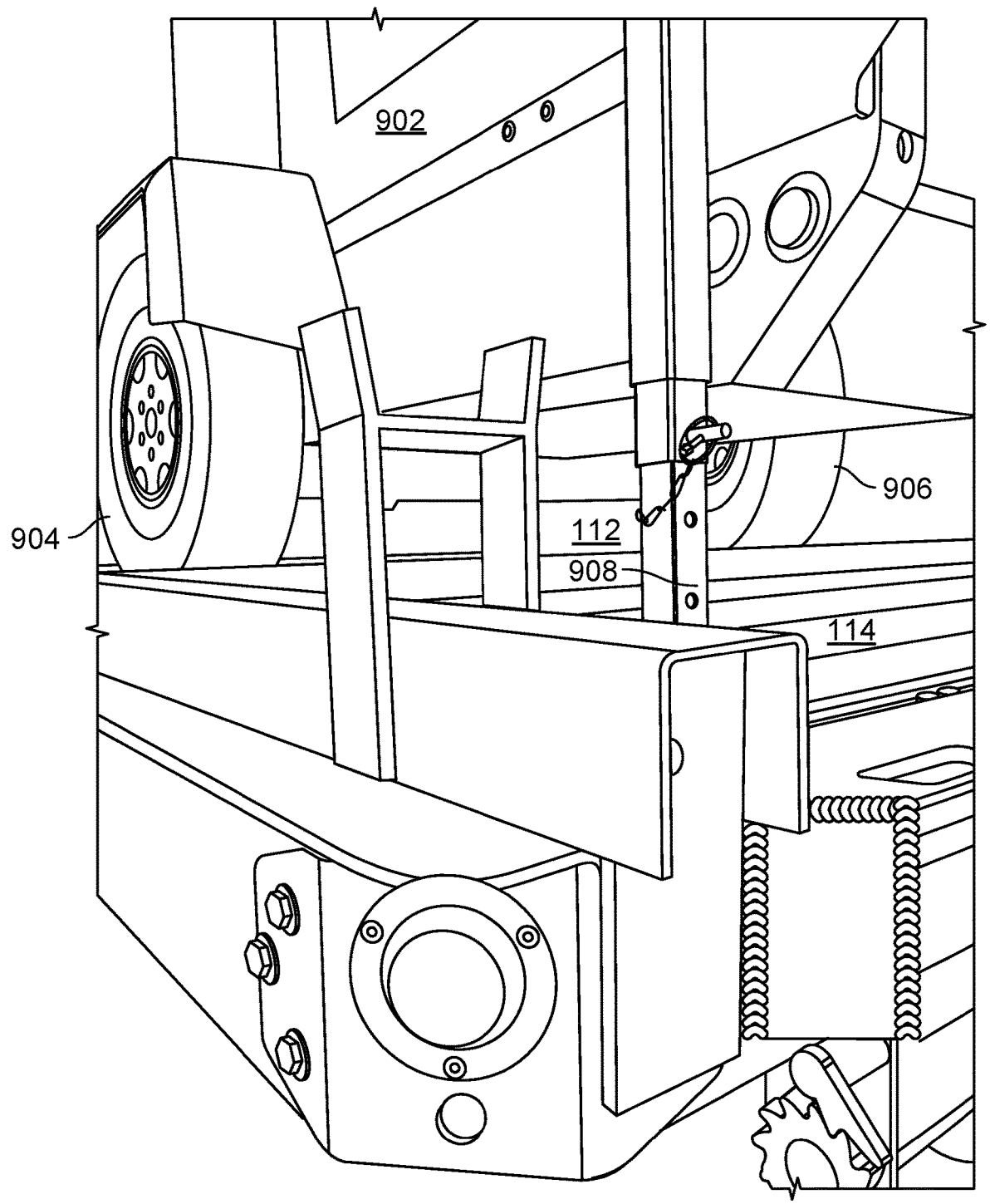
FIG. 9 is an exemplary block diagram illustrating a generator seated on the stackable transport frame on a transport vehicle.

FIG. 9 is an exemplary block diagram illustrating a generator 902 seated on the stackable transport frame 100 on a transport vehicle. The generator 902 includes a first wheel 904 and a second wheel 906 resting within a wheel securing space 112. A portion of a jack 908 is seated within the longitudinal channel 114.

Figure 10:
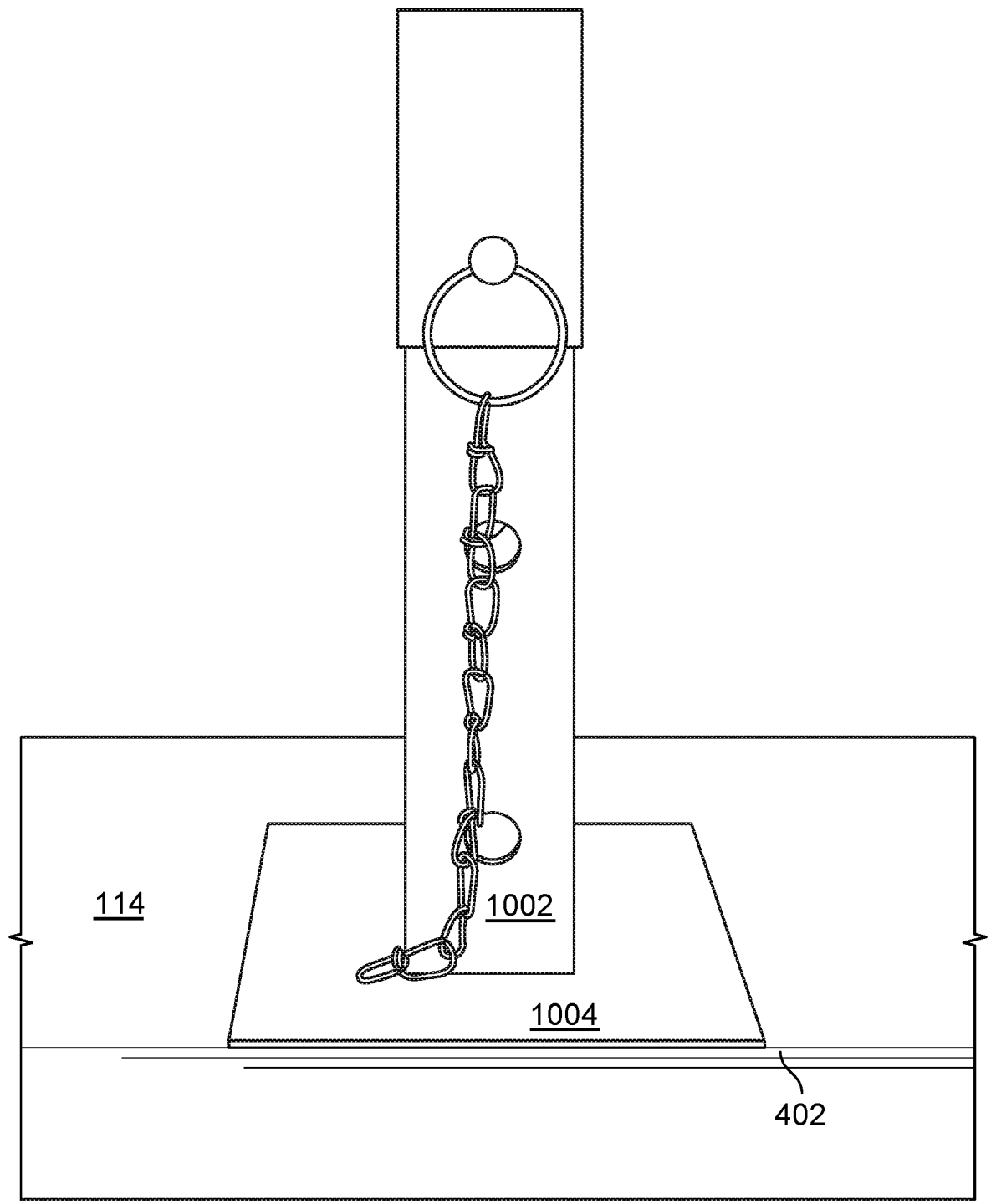
FIG. 10 is an exemplary block diagram illustrating a support member of a generator seated within a longitudinal channel.

FIG. 10 is an exemplary block diagram illustrating a support member 1002 of a generator seated within a longitudinal channel 114. The foot 1004 of the support member 1002 fits within the channel 114. The lip 402 prevents the foot 1004 from slipping or shifting within the channel 114.

In some examples, the channel 114 is substantially flush with the side edge of the trailer when the transport frame is resting on the surface of the trailer. In other examples, the channel 114 is parallel to the side edge of the trailer but not flush with the edge. In other words, there is an offset space between the channel 114 and the side edge of the trailer. In these examples, the channel is placed within the stackable transport frame such that it will align with the support member(s) on the mobile equipment being transported on the transport frames.

In other examples, the width of the channel varies based on the type of generator being transported. In some examples, the channel is narrower (smaller width) than in other examples to accommodate different sizes of support members on the generators.

Figure 11:
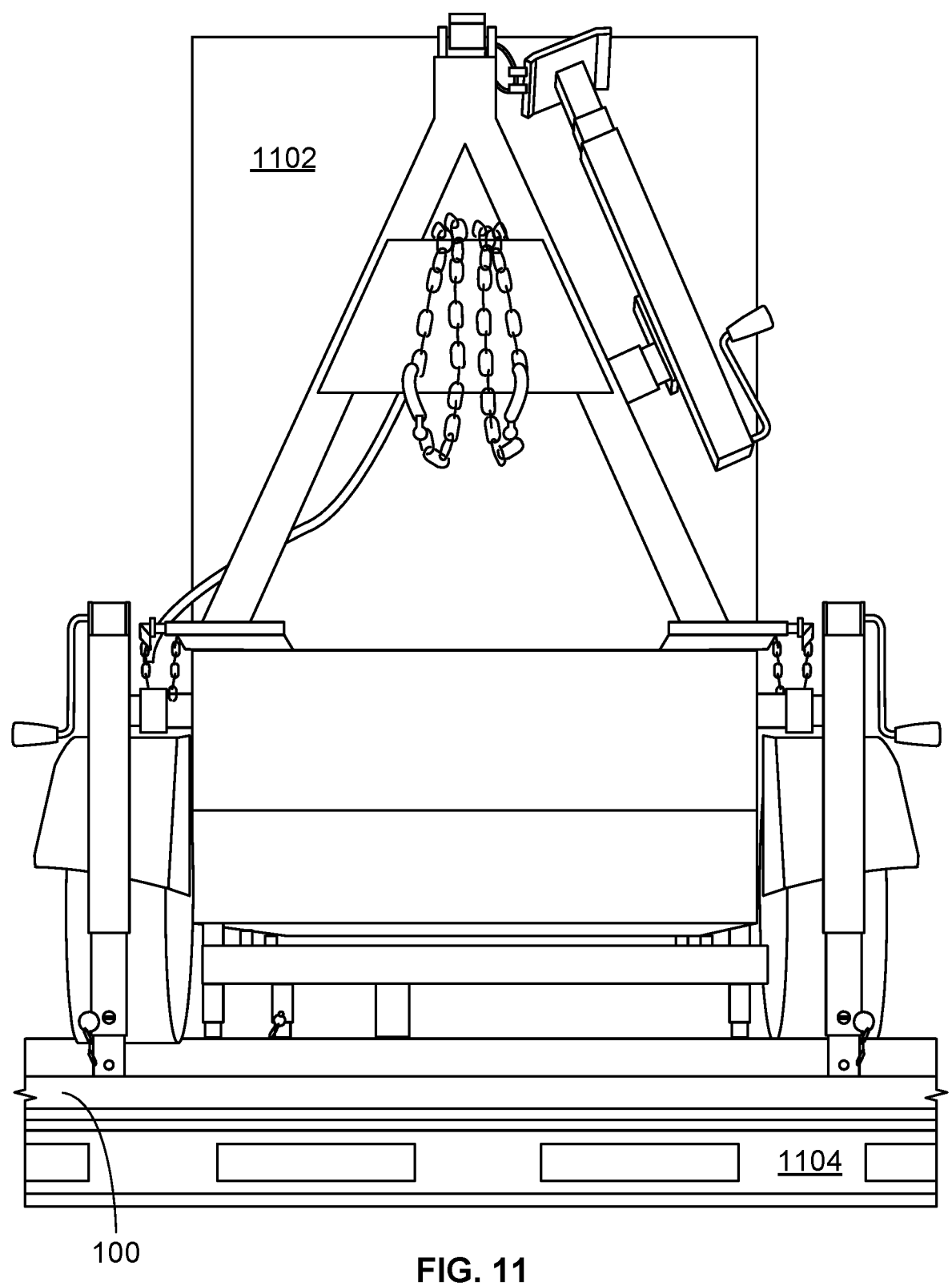
FIG. 11 is an exemplary block diagram illustrating a generator seated on a stackable transport frame secured to a trailer.

FIG. 11 is an exemplary block diagram illustrating a generator 1102 seated on a stackable transport frame 100 secured to a trailer 1104. The stackable transport frame 100 stabilizes the generator 1102 on the trailer 1104 and prevents the generator 1102 from slipping off the trailer during transport.

Figure 12:
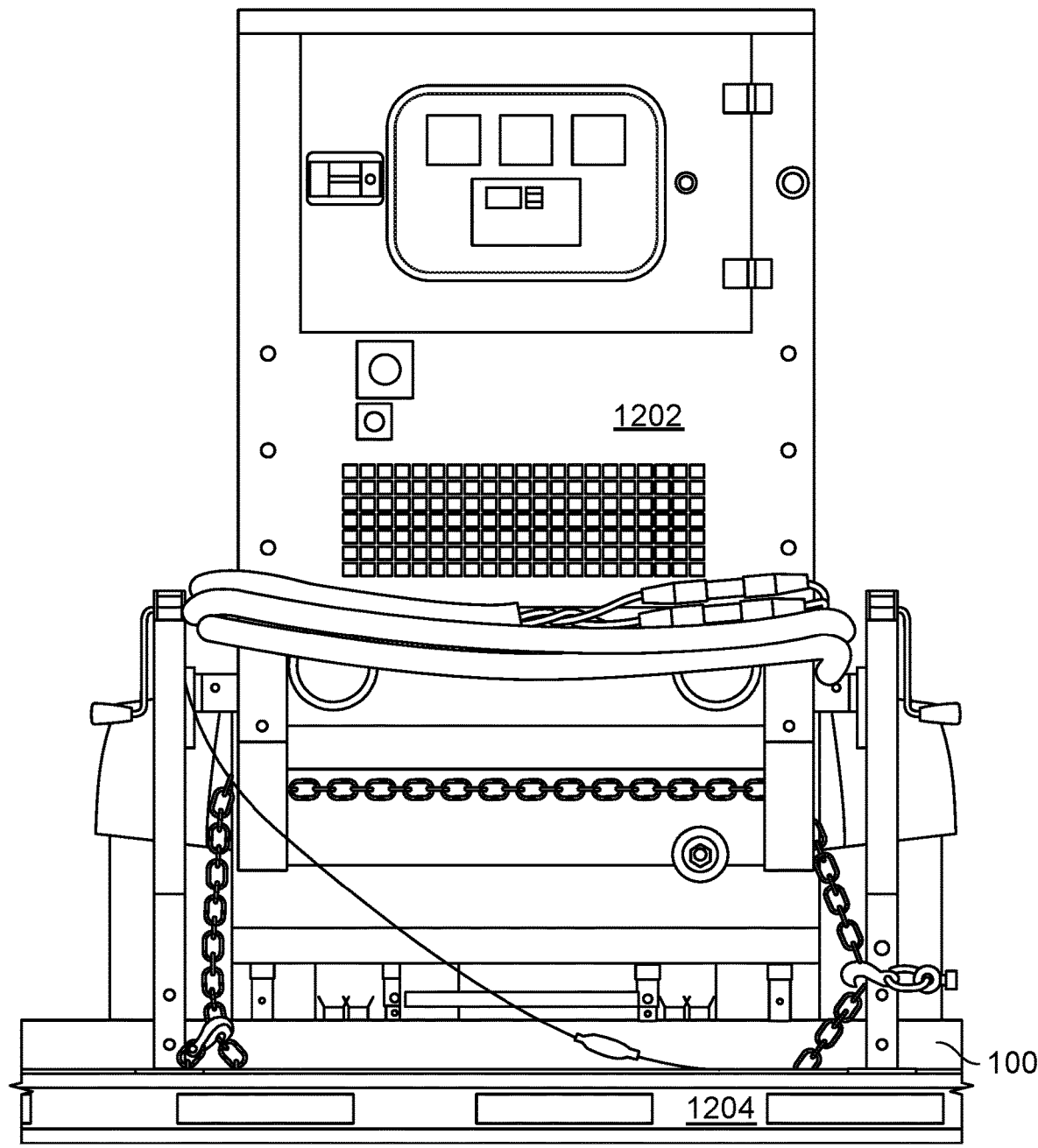
FIG. 12 is an exemplary block diagram illustrating a side view showing a generator on a stackable transport frame secured to a trailer.

FIG. 12 is an exemplary block diagram illustrating a side view showing a generator 1202 on a stackable transport frame 100 secured to a trailer 1204. In this example, the generator 1202 is optionally secured to the trailer 1204 via a chain. In other examples, the generator can be tied down to the trailer with a strap, rope or any other device.

Figure 13:
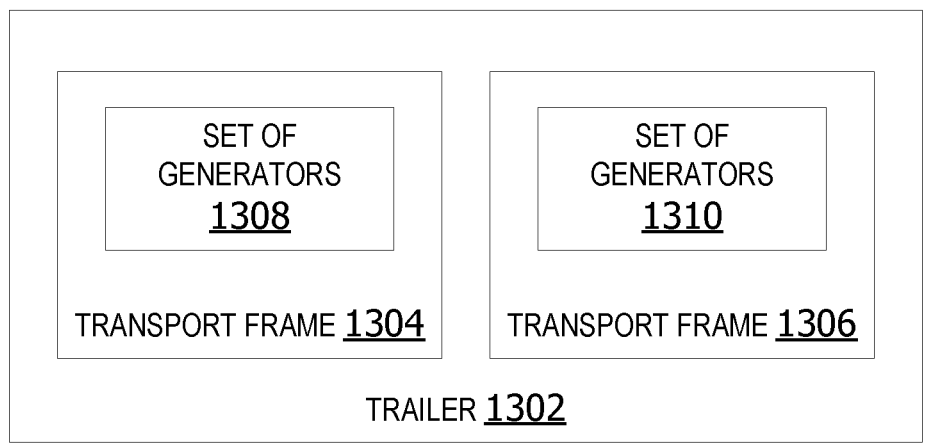
FIG. 13 is an exemplary block diagram illustrating a set of two stackable transport frames on a trailer.

FIG. 13 is an exemplary block diagram illustrating a set of two stackable transport frames on a trailer 1302. The trailer 1302 in this non-limiting example, includes two transport frames. The set of two transport frames includes a first stackable transport frame 1304 having a set of generators 1308 and a second stackable transport frame 1306 having another set of generators 1310. The first stackable transport frame 1304 is a transport frame such as, but not limited to, the stackable transport frame 100 in FIG. 1.

Each transport frame can accommodate one or more generators. In this example, the first stackable transport frame 1304 supports a set of generators 1308 on the frame. The set of generators in this example includes a set of one to five generators. In other words, the stackable transport frame can support a maximum of five generators per transport frame. Thus, the set of two transport frames can accommodate a maximum of ten generators in this non-limiting example.

The examples are not limited to transporting ten generators on two stackable transport frames. In other examples, the number of generators supported on each frame varies depending on the size of the mobile equipment being transported on the stackable transport frame. Thus, a single stackable transport frame in some examples may be capable of supporting one or more pieces of mobile equipment. In one example, if the mobile equipment includes a generator, then a stackable transport frame can support four of five generators.

In this example, the trailer 1302 is a fifty-three-foot long trailer and the stackable transport frame is between twenty and twenty-six feet long. In one non-limiting example, the transport frame is approximately twenty-five feet long.

Thus, the trailer is long enough to accommodate two stackable transport frames. In other examples, a shorter trailer may only be able to accommodate a single transport frame.

Figure 14:
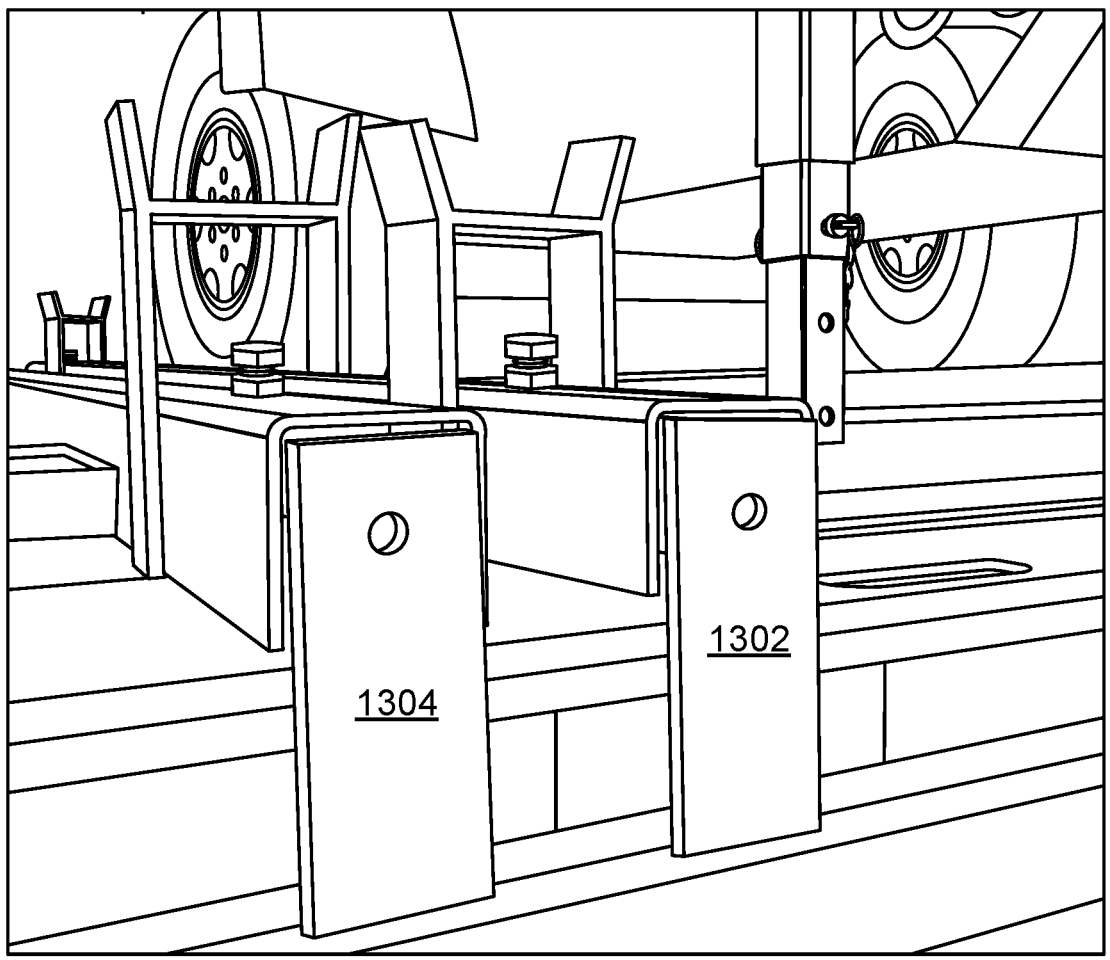
FIG. 14 is an exemplary block diagram illustrating a set of stackable transport frames secured to a trailer.

FIG. 14 is an exemplary block diagram illustrating a set of stackable transport frames secured to a trailer. In this example, the first transport frame 1304 is secured to the trailer via a first set of adjustable brackets. The second transport frame 1306 is secured to the trailer via a second set of adjustable brackets. In some examples, providing two separate stackable transport frames on a single trailer, as shown in FIG. 14, compensates for flexion and torsion taking place in the flatbed trailer during transport. In other words, a single, long rigid transport frame spanning the entire fifty-three-feet length of a flatbed trailer may prevent or disrupt normal flexing and bending of the trailer during transit. Providing two separate transport frames enables flexing and bending between the two frames to take place uninhibited.

Moreover, inflection of trailer sometimes occurs when the trailer is loaded or unloaded. Utilization of two stackable transport frames rather than one longer one allows that inflection point in the middle when the frame is loaded to weigh down and/or flatten the bed.

Figure 15:
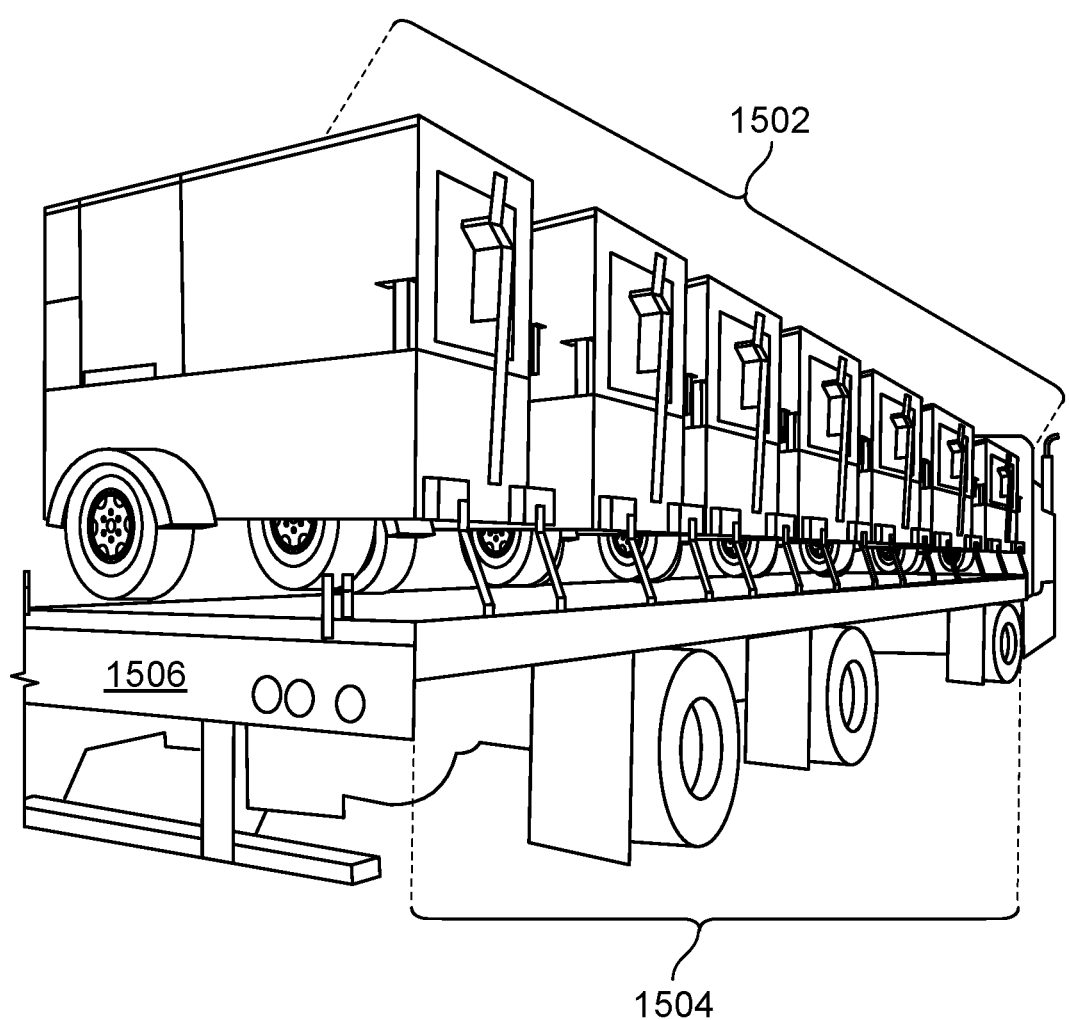
FIG. 15 is an exemplary block diagram illustrating a set of generators on a set of stackable transport frames.

FIG. 15 is an exemplary block diagram illustrating a set of generators 1502 on a set of stackable transport frames 1504. In this example, the set of generators rest on a set of two stackable transport frames on a flatbed trailer 1506.

Figure 16:
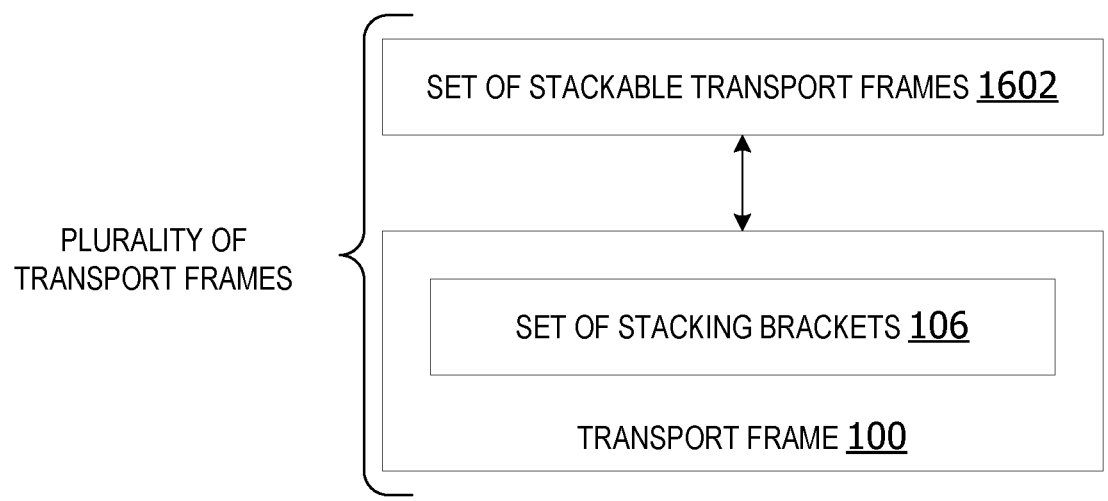
FIG. 16 is an exemplary block diagram illustrating a plurality of stackable transport frames on a set of stacking brackets associated with a stackable transport frame.

FIG. 16 is an exemplary block diagram illustrating a plurality of stackable transport frames on a set of stacking brackets 105 associated with a stackable transport frame 100. In this example, a stackable transport frame 100 includes a set of stacking brackets 105 for supporting a set of one or more transport frames 1602 in a stacked configuration. In the stacked configuration, two or more transport frames are stacked with one on top of the other. The topmost transport frame in the stack rests on the stacking brackets of the transport frame directly beneath it.

Figure 17:
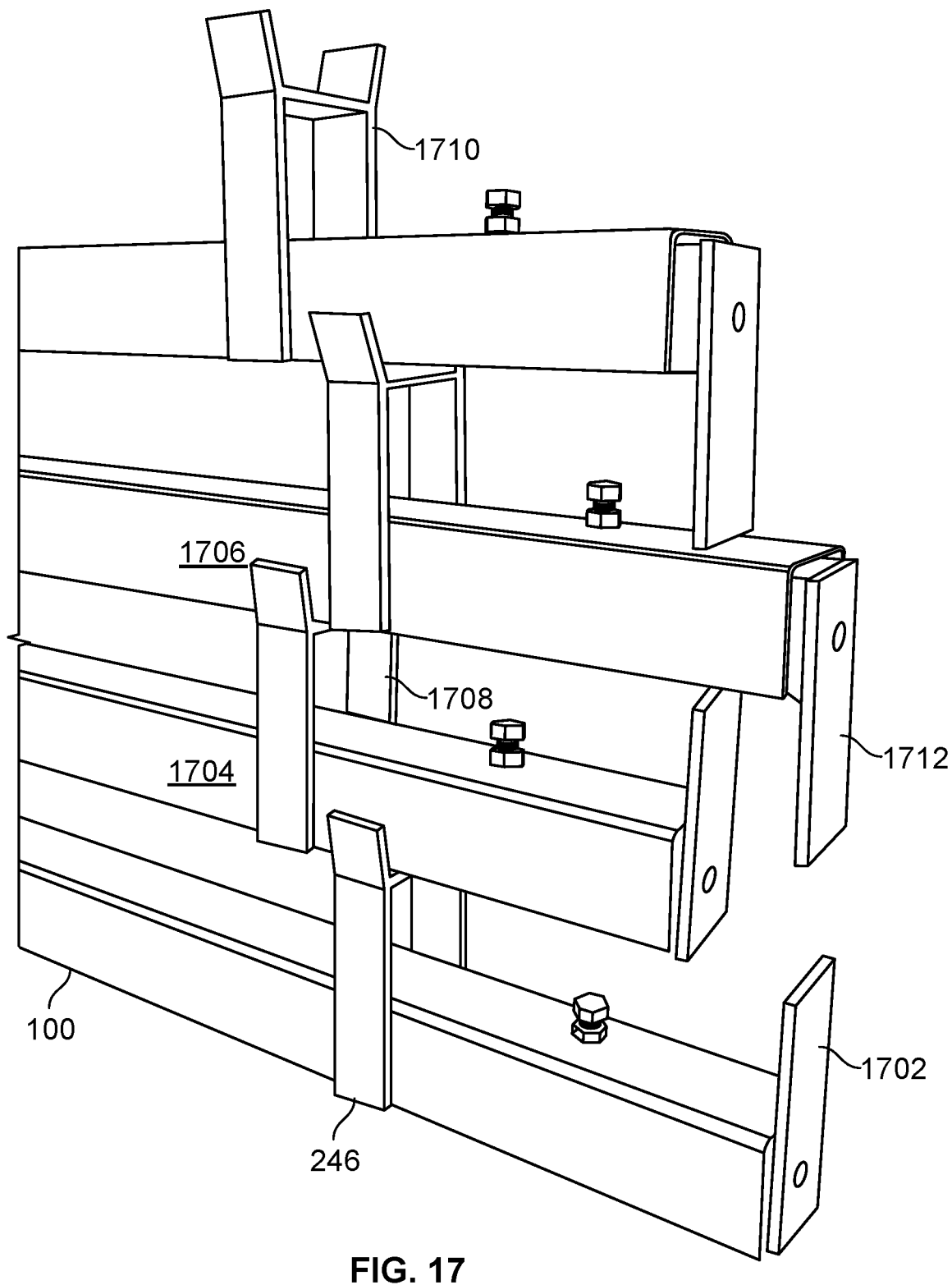
FIG. 17 is an exemplary block diagram illustrating stacking brackets on stackable transport frames in a stacked configuration.

FIG. 17 is an exemplary block diagram illustrating stacking brackets on a portion of stackable transport frames in a stacked configuration. In this example, a set of stacking brackets on at least a portion of the stackable transport frame 100, including the stacking bracket 246, supports at least a portion of a frame member of at least a portion of a second stackable transport frame 1704. In this example, the set of stacking brackets includes four stacking brackets. In other examples, the set of stacking brackets may include two stacking brackets, three stacking brackets, as well as five or more stacking brackets on each stackable transport frame.

The set of stacking brackets on the frame member of the second stackable frame 1704, including a stacking bracket 1708, supports at least a portion of a third frame member of a third stackable transport frame 1706. The portion of the third stackable frame member 1706 shown in this example is the topmost frame. The stacking brackets, including stacking bracket 1710, on the third stackable transport frame are not supporting any additional transport frames.

The adjustable brackets on the first stackable transport frame 100 in this example is placed in an upward orientation 1702 to enable the stackable transport frame 100 to sit flush on the ground. The adjustable brackets on the topmost stackable transport frame in the stack are optionally turned in a downward orientation 1712 in this non-limiting example.

Figure 18:
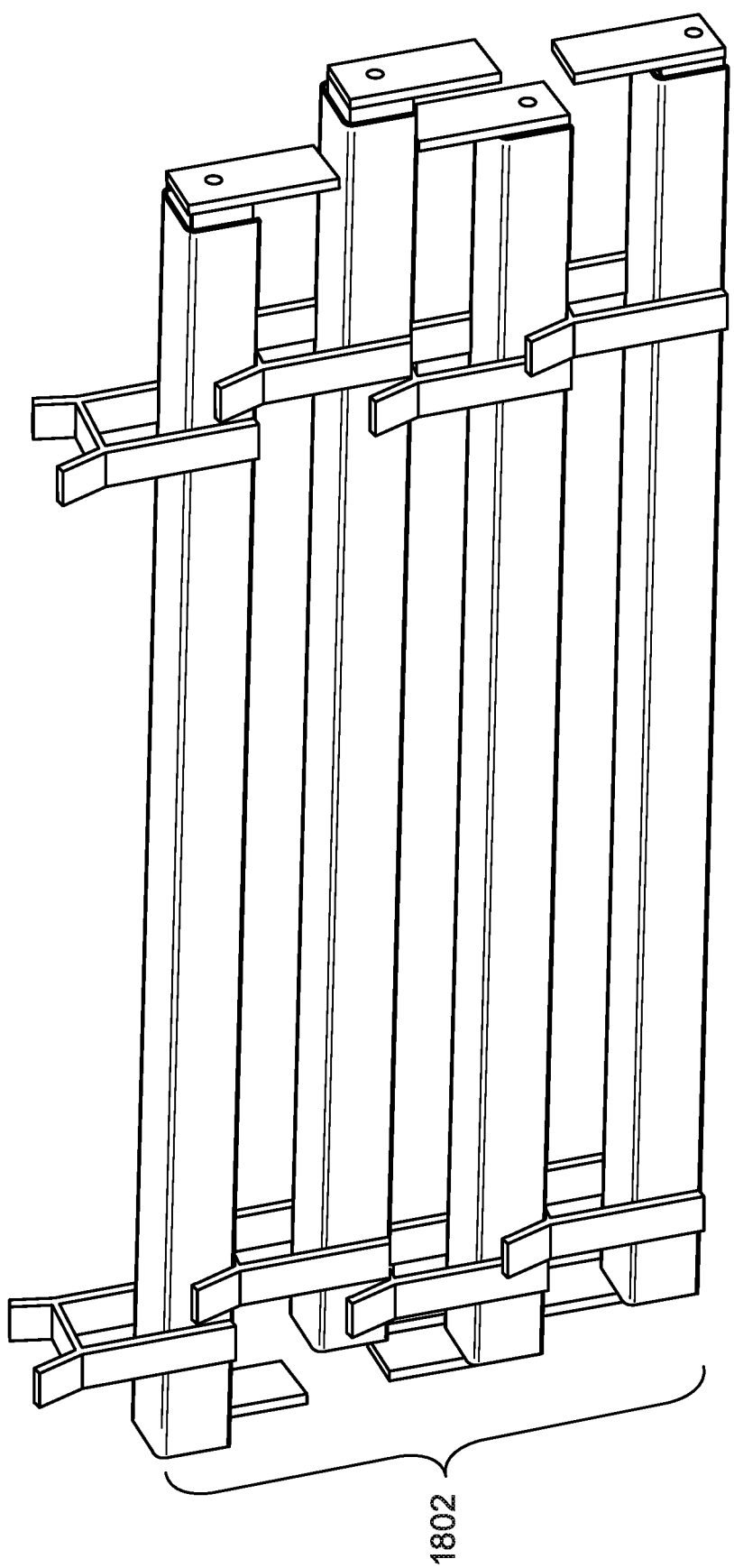
FIG. 18 is an exemplary block diagram illustrating a front view of stackable transport frames in a stacked configuration.

FIG. 18 is an exemplary block diagram illustrating a front view of a portion of stackable transport frames in a stacked configuration. In this example, a portion of a plurality of first frame members of a plurality of transport frames 1802 are shown here in a stacked configuration with each set of stacking brackets on each frame member supporting the frame member on the next transport frame in the stack. The stacking brackets in this non-limiting example are placed with one stacking bracket on each end of the frame member of each stackable transport frame shown in the figure.

Figure 19:
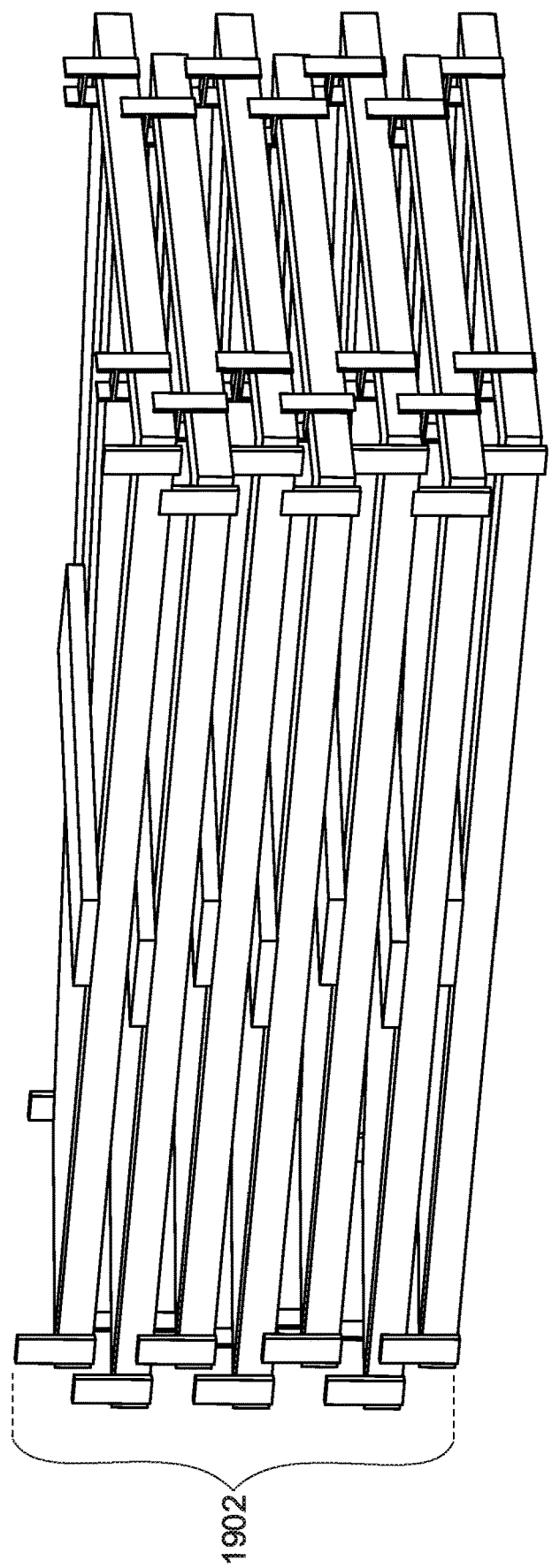
FIG. 19 is an exemplary block diagram illustrating a perspective view of stackable transport frames in a stacked configuration.

FIG. 19 is an exemplary block diagram illustrating a perspective view of stackable transport frames in a stacked configuration. The plurality of transport frames 1902 are shown here in a stacked configuration. In this non-limiting example, a first stackable transport frame is resting on top of a first set of stacking brackets associated with a second stackable transport frame (bottom most). A third stackable transport frame is resting on top of a second set of stacking brackets associated with the first stackable transport frame in a vertical stacked configuration. A fourth stackable transport frame is resting on top of another set of stacking brackets associated with the third stackable transport frame. A fifth stackable transport frame is resting on a set of stacking brackets associated with the fourth stackable transport frame. A sixth stackable transport frame is supported on the set of brackets associated with the fifth stackable transport frame. A seventh stackable transport frame is the topmost frame in the stack. The seventh stackable transport frame is sitting on the set of stacking brackets on the sixth stackable transport frame. The stacking brackets on the seventh stackable transport frame is empty.

There are seven transport frames in the stacked configuration shown in FIG. 19. However, the examples are not limited to stacks of seven frames. In other examples, a stack of transport frames in a stacked configuration can include only two stackable transport frames, three stackable transport frames, as well as four or more. Thus, the stack in other examples can include eight transport frames, ten transport frames or any other number of stacked transport frames.

Figure 20:
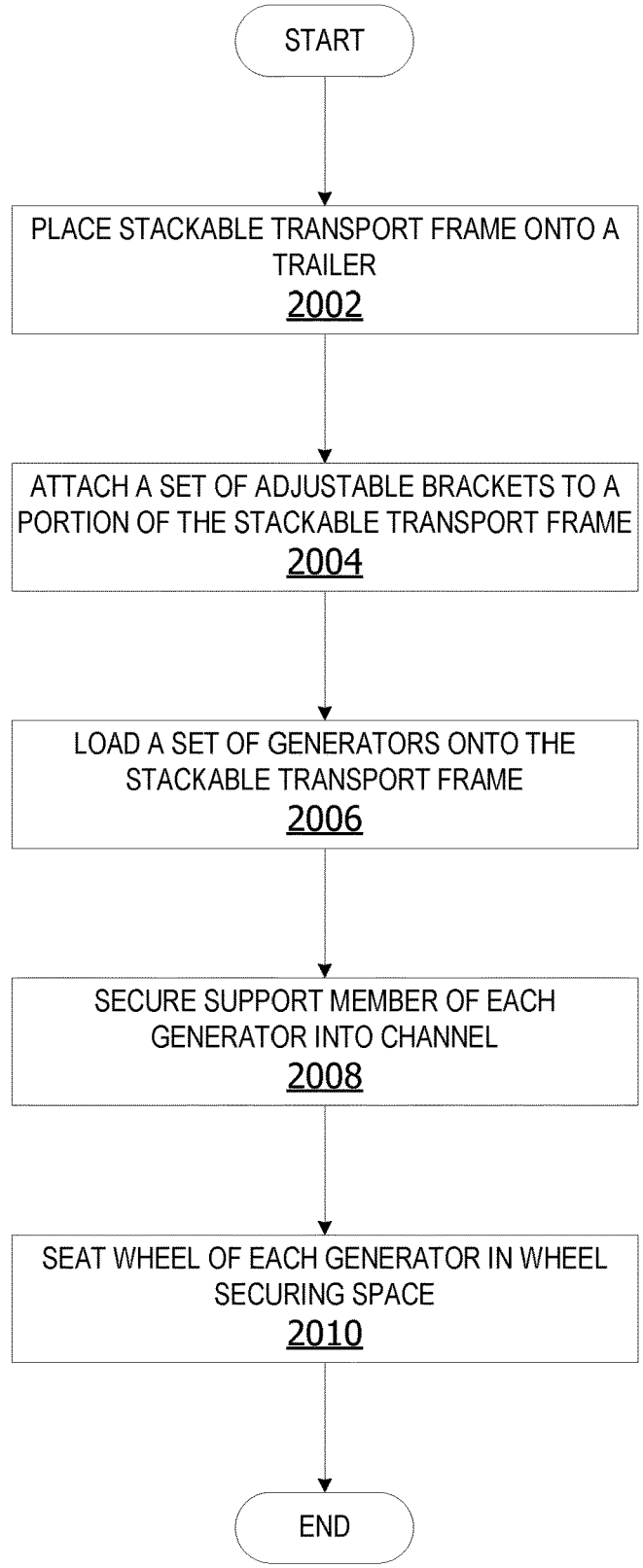
FIG. 20 is a flow chart illustrating an implementation of a stackable transport frame for stabilizing generators on a trailer.

FIG. 20 is a flow chart 2000 illustrating an implementation of a stackable transport frame for stabilizing generators on a trailer. A stackable transport frame is placed onto a trailer at 2002. The stackable transport frame is a frame such as, but not limited to, the stackable transport frame 100 in FIG. 1. The stackable transport frame may be loaded onto the trailer using a forklift.

A set of attachable brackets are used to attach a portion of the stackable transport frame to secure the frame to the trailer at 2004. The attachable brackets are brackets such as, but not limited to, the set of adjustable brackets 106 and 122 in FIG. 1. A set of generators are loaded onto the stackable transport frame at 2006. The one or more generators may be loaded using a forklift.

A support member of each generator is secured in a channel at 2008. The channel is a lengthwise tray or channel, such as, but not limited to, the longitudinal channel 114 in FIG. 1. The wheel of each generator seats in a wheel securing space at 2010. The wheel securing space is defined by a set of two frame members running parallel with the channel. The process terminates thereafter.

Additional Examples

In some examples, a transport frame provides a loading skid or template for loading and transporting mobile generators. The frame fits on any type of flatbed trailer and includes adjustable locking brackets that secure the skid to the trailer, interior parallel elements that prevent sideways movement of the generators during transport while maintaining the width of the load under the department of transportation (DOT) permitting requirements.

In other examples, a pair of recessed elements facilitate rapid implementation of the skid onto the trailer via forklift eliminating the need for specialized equipment. A customized channel well securely accommodates various types of mobile generator form factors. This skid provides for one 53-foot trailer to transport between eight (8) to ten (10) generators, instead of the previous limitation of five (5) generators, due to the orientation of the generators along the skid template. The frame also facilitates rapid loading and unloading, greatly reducing man hours and personnel required while improving operational safety and reducing risk of equipment damage.

In other examples, the frame provides a skid or template that fits on any type of flat-bed trailer. The frame has adjustable locking arms that secures it to the trailer and allows loading of up to ten (10) generators in less than an hour. This reduces generator loading time by seventy-five percent (75%). The frames are also stackable to reduce space required for storage.

In other examples, the transport frame is a frame for loading, unloading, transporting and/or securing generators or other equipment on a trailer. The frame stabilizes the generators or other equipment on a trailer during transport to prevent the equipment from shifting, sliding or falling off the trailer, obligated to use these claims if you want to take a different approach. The frame also provides a framework or guide for assisting a user loading or unloading generators on the trailer to reduce loading and unloading time while preventing damage to equipment. The transport frames enable rapid and safe transport of generators and other equipment to sites of natural disasters for emergency response.

Alternatively, or in addition to the other examples described herein, examples include any combination of the following:

- at least one generator loaded onto the stackable transport frame;
- a set of forklift channels configured to at least partially enclose at least a portion of a set of forks associated with a forklift, wherein the stackable transport frame is moveable via the set of forklift channels;
- a towing member of the mobile equipment, wherein the longitudinal channel is parallel to the second frame member and the third frame member, and wherein the longitudinal channel is configured to seat a portion of the generator towing member during transport;
- a jack associated with a generator, wherein the longitudinal channel is configured to seat a portion of the jack during transport;
- a first threaded shaft associated with the first end of the first frame member, wherein a first threaded bolt is configured to removably attach the first adjustable bracket to the first end of the first frame member via the first threaded shaft;
- a second threaded shaft associated with the second end of the first frame member, wherein a second bolt is configured to removably attached the second adjustable bracket to the second end of the first frame member via the second threaded shaft;
- a first adjustable bracket removably attached to a first end of the first frame member;
- a second adjustable bracket removably attached to a second end of the first frame member, wherein the first adjustable bracket and the second adjustable bracket are configured to removably secure the stackable transport frame to at least a portion of a trailer in a vertical and downward orientation substantially perpendicular to the first frame member;
- the stackable transport frame in a plurality of stackable transport frames in the vertical stacked orientation;
- a first stackable transport frame having the set of adjustable brackets secured in a vertical and upward orientation;
- the set of stacking brackets supporting at least one stackable transport frame resting on top of the set of stacking brackets;
- placing a stackable transport frame onto a surface of a cargo area of a transport vehicle via a set of forklift channels configured to at least partially enclose at least a portion of a set of forks associated with a forklift, wherein the stackable transport frame is moveable via the set of forklift channels;
- attaching a set of adjustable brackets to at least a portion of a first frame member via a set of fasteners, wherein the set of adjustable brackets are configured to removably secure the stackable transport frame to at least a portion of a transport vehicle;
- loading a set of mobile equipment onto the stackable transport frame, wherein a second frame member parallel to a third frame member defines a wheel securing aperture configured to accommodate at least one wheel of each item of mobile equipment loaded onto the stackable transport frame;
- securing at least a portion of a support member of each mobile equipment in the set of mobile equipment loaded onto the stackable transport frame within a longitudinal channel configured to at least partially enclose a portion of a mobile equipment support member;
- stacking a plurality of stackable transport frames in a vertical stacked configuration, wherein a set of stacking brackets associated with a first stackable transport frame supports at least a portion of a second stackable transport frame;
- securing the set of adjustable brackets in a vertical and downward orientation to secure the stackable transport frame to at least a portion of a trailer;
- securing the set of adjustable brackets in a vertical and upward orientation for stacking using the set of fasteners;
- stacking a plurality of transport frames in a vertical stacked configuration, wherein a first stackable transport frame in the plurality of transport frames rests on top of a set of stacking brackets associated with a second stackable transport frame;
- a first adjustable bracket removably attached to a first end of a first frame member;
- a second adjustable bracket removably attached to a second end of the first frame member, wherein the first adjustable bracket and the second adjustable bracket are configured to removably secure the stackable transport frame to at least a portion of a trailer;
- a second frame member parallel to a third frame member defining a wheel securing aperture configured to accommodate at least one wheel of at least one generator;
- a set of forklift channels configured to at least partially enclose at least a portion of a set of forks associated with a forklift, wherein the stackable transport frame is moveable via the set of forklift channels;
- a longitudinal channel configured to at least partially enclose a portion of a generator support member, wherein the longitudinal channel is parallel to the second frame member and the third frame member;
a set of stacking brackets associated with at least one frame member, wherein the set of stacking brackets configured to support a set of stackable transport frames in a vertical stacked configuration;
a first threaded shaft associated with the first end of the first frame member, wherein a first threaded bolt is configured to removably attach the first adjustable bracket to the first end of the first frame member via the first threaded shaft;
a second threaded shaft associated with the second end of the first frame member, wherein a second bolt is configured to removably attached the second adjustable bracket to the second end of the first frame member via the second threaded shaft;
a first stackable transport frame having the set of adjustable brackets secured in a vertical and upward orientation;
the set of stacking brackets supporting at least one stackable transport frame resting on top of the set of stacking brackets;
a first stackable transport frame resting on top of a first set of stacking brackets associated with a second stackable transport frame;
a third stackable transport frame resting on top of a second set of stacking brackets associated with a third stackable transport frame in a vertical stacked configuration; and
a set of generators loaded onto the stackable transport frame.

When introducing elements of aspects of the disclosure or the implementations thereof, the articles "a," "an," "the," and "said" are intended to mean that there are one or more of the elements. The terms "comprising," "including," and "having" are intended to be inclusive and mean that there could be additional elements other than the listed elements. The term "implementation" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A stackable transport frame comprising:
a set of adjustable brackets removably attached to at least a portion of a first frame member via a set of fasteners, wherein the set of adjustable brackets are configured to removably secure the stackable transport frame to at least a portion of a transport vehicle;
a second frame member parallel to a third frame member defining a wheel securing aperture configured to accommodate at least one wheel associated with mobile equipment;
a set of stacking brackets associated with at least one frame member, the set of stacking brackets configured to support a set of stackable transport frames in a vertical stacked configuration; and
a longitudinal channel configured to at least partially enclose a portion of a mobile equipment support member.

2. The stackable transport frame of claim 1, further comprising:
wherein at least one mobile equipment in a set of mobile equipment associated with the stackable transport frame is a generator.

3. The stackable transport frame of claim 1, further comprising:
a set of forklift channels configured to at least partially enclose at least a portion of a set of forks associated with a forklift, wherein the stackable transport frame is moveable via the set of forklift channels.

4. The stackable transport frame of claim 1, further comprising:
a towing member of the mobile equipment, wherein the longitudinal channel is parallel to the second frame member and the third frame member, and wherein the longitudinal channel is configured to seat a portion of the towing member during transport.

5. The stackable transport frame of claim 1, further comprising:
a jack associated with mobile equipment, wherein the longitudinal channel is configured to seat a portion of the jack during transport.

6. The stackable transport frame of claim 1, further comprising:
a first threaded shaft associated with the first end of the first frame member, wherein a first threaded bolt is configured to removably attach a first adjustable bracket to the first end of the first frame member via the first threaded shaft; and
a second threaded shaft associated with the second end of the first frame member, wherein a second bolt is configured to removably attached a second adjustable bracket to the second end of the first frame member via the second threaded shaft.

7. The stackable transport frame of claim 1, wherein the set of adjustable brackets further comprises:
a first adjustable bracket removably attached to a first end of the first frame member; and
a second adjustable bracket removably attached to a second end of the first frame member, wherein the first adjustable bracket and the second adjustable bracket are configured to removably secure the stackable transport frame to at least a portion of a trailer in a vertical and downward orientation substantially perpendicular to the first frame member.

8. The stackable transport frame of claim 1, further comprising:
the stackable transport frame in a plurality of stackable transport frames in the vertical stacked orientation.

9. The stackable transport frame of claim 8, further comprising:
a first stackable transport frame having the set of adjustable brackets secured in a vertical and upward orientation; and
a set of stacking brackets supporting at least one stackable transport frame resting on top of the set of stacking brackets.

10. A method for transporting equipment using a stackable transport frame, the method comprising:
placing a stackable transport frame onto a surface of a cargo area of a transport vehicle via a set of forklift channels configured to at least partially enclose at least a portion of a set of forks associated with a forklift, wherein the stackable transport frame is moveable via the set of forklift channels;

attaching a set of adjustable brackets to at least a portion of a first frame member via a set of fasteners, wherein the set of adjustable brackets are configured to removably secure the stackable transport frame to at least a portion of a transport vehicle;

loading a set of mobile equipment onto the stackable transport frame, wherein a second frame member parallel to a third frame member defines a wheel securing aperture configured to accommodate at least one wheel associated with mobile equipment in the set of mobile equipment loaded onto the stackable transport frame; and securing at least a portion of a support member of each mobile equipment in the set of mobile equipment loaded onto the stackable transport frame within a longitudinal channel configured to at least partially enclose a portion of a mobile equipment support member.

11. The method of claim 10, further comprising:
stacking a plurality of stackable transport frames in a vertical stacked configuration, wherein a set of stacking brackets associated with a first stackable transport frame supports at least a portion of a second stackable transport frame.

12. The method of claim 10, further comprising:
securing the set of adjustable brackets in a vertical and downward orientation to secure the stackable transport frame to at least a portion of a trailer.

13. The method of claim 10, further comprising:
securing the set of adjustable brackets in a vertical and upward orientation for stacking using the set of fasteners.

14. The method of claim 10, further comprising:
stacking a plurality of transport frames in a vertical stacked configuration, wherein a first stackable transport frame in the plurality of transport frames rests on top of a set of stacking brackets associated with a second stackable transport frame.

15. A stackable generator transport frame comprising:
a first adjustable bracket removably attached to a first end of a first frame member;
a second adjustable bracket removably attached to a second end of the first frame member, wherein the first adjustable bracket and the second adjustable bracket are configured to removably secure the stackable transport frame to at least a portion of a trailer;
a second frame member parallel to a third frame member defining a wheel securing aperture configured to accommodate at least one wheel of at least one generator;
a set of forklift channels configured to at least partially enclose at least a portion of a set of forks associated with a forklift, wherein the stackable transport frame is moveable via the set of forklift channels; and
a longitudinal channel configured to at least partially enclose a portion of a generator support member, wherein the longitudinal channel is parallel to the second frame member and the third frame member.

16. The stackable generator transport frame of claim 15, further comprising:
a set of stacking brackets associated with at least one frame member, wherein the set of stacking brackets is configured to support a set of stackable transport frames in a vertical stacked configuration.

17. The stackable generator transport frame of claim 15, further comprising:
a first threaded shaft associated with the first end of the first frame member, wherein a first threaded bolt is configured to removably attach the first adjustable bracket to the first end of the first frame member via the first threaded shaft; and
a second threaded shaft associated with the second end of the first frame member, wherein a second bolt is configured to removably attached the second adjustable bracket to the second end of the first frame member via the second threaded shaft.

18. The stackable generator transport frame of claim 15, further comprising:
a first stackable transport frame having a set of adjustable brackets secured in a vertical and upward orientation; and
a set of stacking brackets supporting at least one stackable transport frame resting on top of the set of stacking brackets.

19. The stackable generator transport frame of claim 15, further comprising:
a first stackable transport frame resting on top of a first set of stacking brackets associated with a second stackable transport frame; and
a third stackable transport frame resting on top of a second set of stacking brackets associated with a third stackable transport frame in a vertical stacked configuration.

20. The stackable generator transport frame of claim 15, further comprising:
a set of generators loaded onto the stackable transport frame.

* * * * *